United States Patent
Nishijima et al.

(10) Patent No.: US 7,317,262 B2
(45) Date of Patent: Jan. 8, 2008

(54) ENGINE STARTING APPARATUS WITH ANTITHEFT FUNCTION, VEHICLE INCORPORATING THE APPARATUS, AND METHOD OF USING SAME

(75) Inventors: Hiroshi Nishijima, Saitama (JP); Naoki Murasawa, Saitama (JP); Tatsuo Hayashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 430 days.

(21) Appl. No.: 10/905,134

(22) Filed: Dec. 17, 2004

(65) Prior Publication Data

US 2006/0131959 A1    Jun. 22, 2006

(30) Foreign Application Priority Data

Dec. 17, 2003   (JP)   ............................. 2003-419792

(51) Int. Cl.
  *B60R 25/00*   (2006.01)
(52) U.S. Cl. ..................................... 307/10.2
(58) Field of Classification Search .............. 307/10.2
  See application file for complete search history.

(56) References Cited

U.S. PATENT DOCUMENTS

| | | | |
|---|---|---|---|
| 4,492,959 A | 1/1985 | Mochida et al. | |
| 6,144,113 A | 11/2000 | Hayashi et al. | |
| 6,144,294 A * | 11/2000 | Watanabe | 340/426.35 |
| 6,914,516 B2 * | 7/2005 | Konno et al. | 340/5.64 |

2002/0190843 A1   12/2002   Konno et al.

FOREIGN PATENT DOCUMENTS

| | | |
|---|---|---|
| EP | 0888940 | 1/1999 |
| FR | 2752549 | 2/1998 |
| JP | 11227649 | 8/1999 |
| JP | 2000-329041 | 11/2000 |
| JP | 2000329041 | 11/2000 |
| JP | 2002370621 | 12/2002 |
| WO | WO 0134439 | 5/2001 |

* cited by examiner

*Primary Examiner*—Robert L. DeBeradinis
(74) *Attorney, Agent, or Firm*—Carrier, Blackman & Associates, P.C.; William D. Blackman; Joseph P. Carrier

(57) ABSTRACT

An engine starting apparatus with an antitheft function enables rapid and secure starting of a kick-started engine. The engine starting apparatus includes an immobilizer CPU and an ignition CPU, which cooperate to enable authorized engine startup and to prevent unauthorized access. The immobilizer CPU outputs a permission signal if an authentication code from the outside corresponds to a reference code in a vehicle, but outputs an inhibition signal if the authentication code and the reference code fail to correspond. When a starting pedal is kicked, the ignition CPU begins to energize the engine's ignition system, in response to a predetermined engine starting instruction, before the input reference code is verified. If proper authentication is verified by the permission signal, the ignition CPU continues to allow normal engine starting procedure. If the inhibition signal is received from the immobilizer CPU, the ignition CPU interrupts the normal procedure and inhibits engine starting.

15 Claims, 6 Drawing Sheets

ENGINE STARTING APPARATUS WITH ANTITHEFT FUNCTION, VEHICLE INCORPORATING THE APPARATUS, AND METHOD OF USING SAME

CROSS-REFERENCE TO RELATED APPLICATIONS

The present invention claims priority under 35 USC 119 based on Japanese Patent Application No. 2003-419792, filed Dec. 17, 2003. The entire subject matter of the priority document is incorporated herein by reference.

BACKGROUND OF THE INVENTION

The present invention relates to an engine starting apparatus with an antitheft function. More particularly, the present invention relates to an engine starting apparatus, with an antitheft function, suitable for use with a motorcycle which includes a kick-starting mechanism.

Some engine startup devices including anti-theft features are known. An immobilizer of the transponder type, which utilizes an authentication code, is known for use as a vehicle antitheft apparatus, such as that disclosed in Japanese Laid-Open Patent No. 2000-329041. The immobilizer described in this reference is used as a substitute security device in place of a conventional lock apparatus of the mechanical locking type, such as a handlebar lock apparatus and a wheel lock apparatus.

In an immobilizer of the type described in the reference, an authentication code, registered in advance in an ignition key or a portable terminal module, is transmitted toward an authentication apparatus attached to the vehicle body side. If the authentication code coincides, or has a predetermined relationship with an authentication code registered in advance in the authentication apparatus, then starting of an engine is enabled. However, if they do not coincide with each other, or do not have the predetermined relationship, then starting of the engine is prevented.

In the apparatus disclosed in Japanese Laid-Open Patent No. 2000-329041, the authentication apparatus receives power from a power supply carried on the vehicle body. Accordingly, if sufficient power is not supplied to the authentication apparatus, because of a drop of a battery voltage or the like, then verification of the authentication codes cannot be performed. Particularly with a motorcycle, since a battery carried thereon often has a comparatively small capacity, a drop of the battery voltage must be considered.

A technique is disclosed in Japanese Laid-Open Patent No. 2002-370621 to make it possible to authenticate an authentication code, even in a condition where the battery voltage is low. This technique divides an authentication procedure of a code in a motorcycle which includes a kick-starting mechanism into three stages, and advances the authentication procedure by one stage by one kick operation. Accordingly, starting of the engine is allowed after three kick operations.

According to Japanese Laid-Open Patent No. 2002-370621, mentioned above, starting of the engine is permitted only after the validity of an authentication code is confirmed. Thus, even if a generator is driven by a kick-starting mechanism, and driving power is obtained thereby, the power obtained by the first kick is all consumed in the authentication procedure of the authentication code. Consequently, the engine cannot be started by the first kick, but at least three kick operations are required before the engine is started.

Although the known devices have some utility for their intended purposes, a need still exists in the art for an improved authenticating apparatus for a motorcycle. In particular, there is a need for an improved authenticating apparatus which ensures security, yet which enables a user to start an engine in a shorter period of time than the previously known technology.

SUMMARY OF THE INVENTION

The present invention provides an engine starting apparatus with an antitheft function, which improves over the known technology described above, and which can start an engine in a short period of time when the engine is started by a kick.

An engine starting apparatus with an antitheft function according to a first embodiment of the present invention compares an authentication code, fed in from the outside, with a reference code registered in advance in a vehicle, and starting of an engine is permitted or inhibited depending upon whether or not the two codes correspond according to a relationship set in advance. The engine starting apparatus of the first embodiment hereof is characterized in that the following measures are taken.

(1) The engine starting apparatus with an antitheft function according to the first embodiment hereof includes a permission signal generator for outputting a permission signal if the authentication code and the reference code correspond, but outputting an inhibition signal if the authentication code and the reference code have any other relationship as an authentication result. The engine staffing apparatus also includes a starting control mechanism for beginning staffing control in response to a predetermined engine starting instruction before the authentication result is sent out; and the starting control mechanism continues the starting control in response to the permission signal but stops the starting control in response to the inhibition signal.

(2) In a modified aspect of the first embodiment, the engine starting apparatus with an antitheft function is further characterized in that the engine staffing apparatus further includes a regulator for regulating a driving voltage obtained by kick staffing and outputting the regulated driving voltage to a power supply line, a first feed line for supplying the driving voltage from the power supply line to the authentication mechanism, and a second feed line for supplying the driving voltage from the power supply line to the staffing control mechanism through a first switch, that the authentication mechanism starts the authentication when the driving voltage exceeds a predetermined value, and the starting control mechanism begins the staffing control when the first switch is on and the driving voltage exceeds the predetermined value.

(3) In another modified aspect of the first embodiment, the engine staffing apparatus with an antitheft function is further characterized in that it further includes an electric load to which the driving voltage is supplied from the power supply line through a second switch, and that the second switch is controlled to an off state for a period of time before the engine exhibits full combustion after the staffing control is begun.

(4) In another modified aspect of the first embodiment, the engine staffing apparatus with an antitheft function is further characterized in that the staffing control mechanism permits or inhibits operation of an ignition system in response to the authentication result.

According to the described first embodiment of the present invention, the following effects are achieved.

(1) According to a first aspect of the invention, starting of the engine is permitted before the validity of the authentication code is confirmed. Thereafter, the starting control is continued until after the validity of the authentication code is denied. The starting of the engine is inhibited only after the validity is denied. Therefore, where the starting operation is performed using the normal authentication code, the starting of the engine can be performed in a short period of time.

(2) According to a second aspect of the invention, since the driving voltage obtained by the first kick starting operation is supplied to the starting control mechanism, starting of the engine can be begun with the first kick starting operation.

(3) According to a third aspect of the invention, since power is not supplied to the electric load before the engine exhibits a full combustion and the power obtained by the kick starting can be fully used for the staffing of the engine, the engine can be staffed with low power.

(4) According to another aspect of the invention, since operation of the ignition system is inhibited and the starting of the engine is limited thereby, when the validity of the authentication code is denied, the starting of the engine can be prevented with certainty.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION

It should be understood that only structures considered necessary for clarifying the present invention are described herein. Other conventional structures, and those of ancillary and auxiliary components of the system, are assumed to be known and understood by those skilled in the art.

Figure 1:
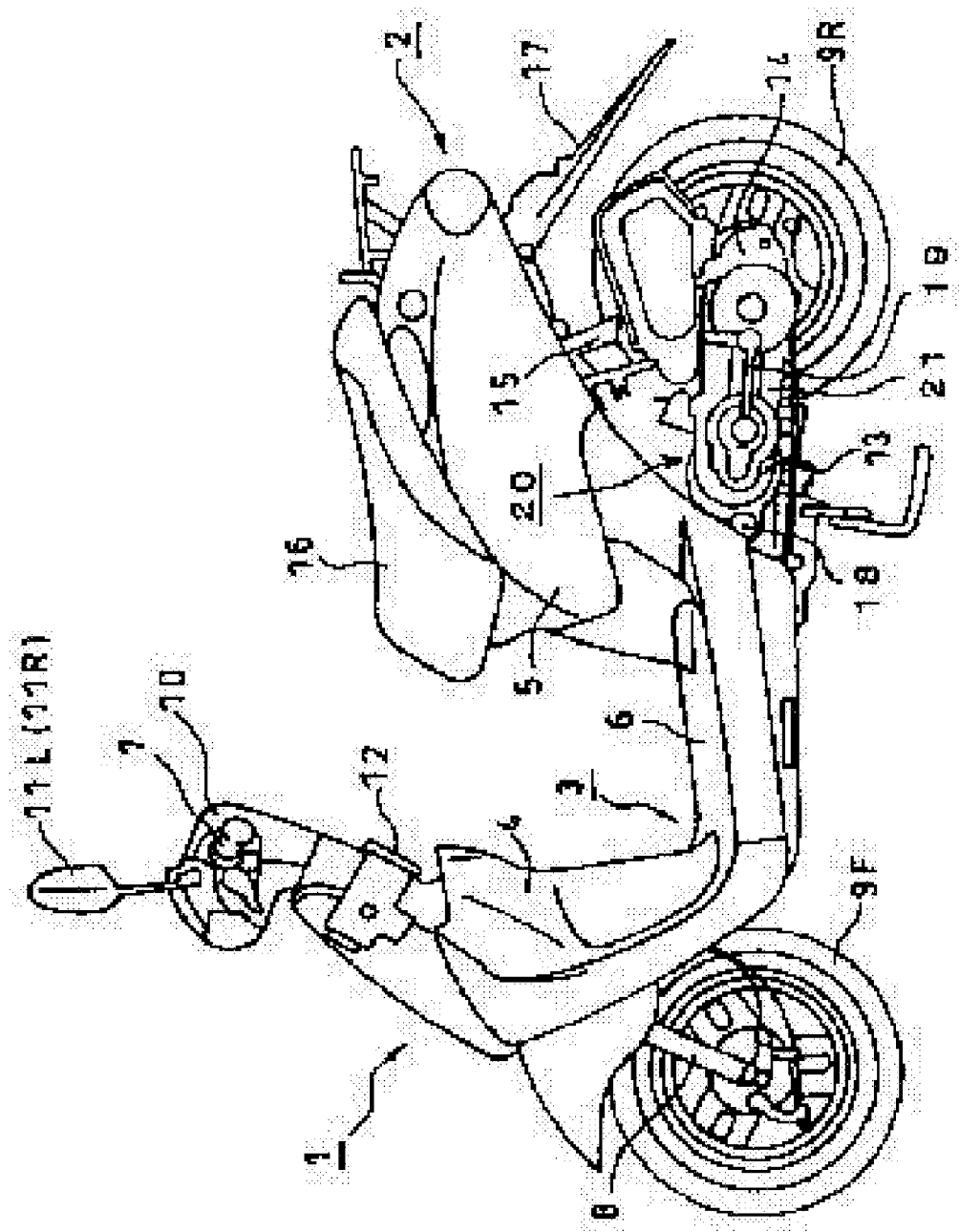
FIG. 1 is a side elevational view of an appearance of a scooter type motorcycle to which an engine starting apparatus with an antitheft function according to the present invention is applied.

In the following discussion, an illustrative embodiment of the present invention is described in detail with reference to the drawings. FIG. 1 is a side elevational view of a scooter-type motorcycle, to which an engine starting apparatus with an antitheft function according to a first embodiment of the present invention is applied.

The motorcycle includes a vehicle body front portion 1 and a vehicle body rear portion 2, connected to each other through a low floor portion 3. The remaining skeleton of the motorcycle, other than the parts already mentioned, is formed as a vehicle body frame including a down tube and a main pipe.

The vehicle body front portion 1, vehicle body rear portion 2 and floor portion 3 are covered with a front cover 4, a body cover 5 and a center cover 6, respectively. On the vehicle body front portion 1, a handlebar 7 is supported for rotation on a steering head, and provided at an upper location, while a front fork 8 is supported for rotation on and extends downwardly from the steering head. A front wheel 9F is supported for rotation at a lower end of the front fork 8.

A swing unit 20 is connected and supported for rocking motion to and at a lower end of a rising portion of the main pipe through a link member 18. A four single-cylinder four-cycle engine 13 is carried at a front portion of the swing unit 20. A kick pedal 19 for starting the engine when the battery voltage is low is connected to a crankshaft of the engine 13. A belt type continuously variable transmission 21 extends rearwardly from the engine 13, and a rear wheel 9R is supported for rotation on a reduction gear 14 provided at a rear portion of the continuously variable transmission 21 through a centrifugal clutch. A rear suspension 15 is interposed between an upper end of the reduction gear 14 and the main pipe.

An upper portion of the handlebar 7 is covered with a handlebar cover 10, which also serves as an instrument panel. The steering head, front fork 8 and handlebar 7 form a steering mechanism. Grip portions of the handlebar 7 project leftwardly and rightwardly of the vehicle body from the handlebar cover 10, and a side mirror 11L (11R) projects upwardly from the handlebar cover 10. A handlebar lock module 12 is operable to lock the handlebar 7, in order to disable steering.

A seat 16 is provided above the body cover 5, in such a manner as to cover an accommodation box. The seat 16 can be opened and closed, and a helmet or the like can be accommodated in the accommodation box, below the seat 16. A number plate attaching portion 1 7, a luggage, a tail lamp and so forth are provided at a rear portion of the body cover 5. Although an intake pipe, a carburetor, an air cleaner and so forth are disposed incidentally to the engine, they are not shown in the drawings.

Figure 2:
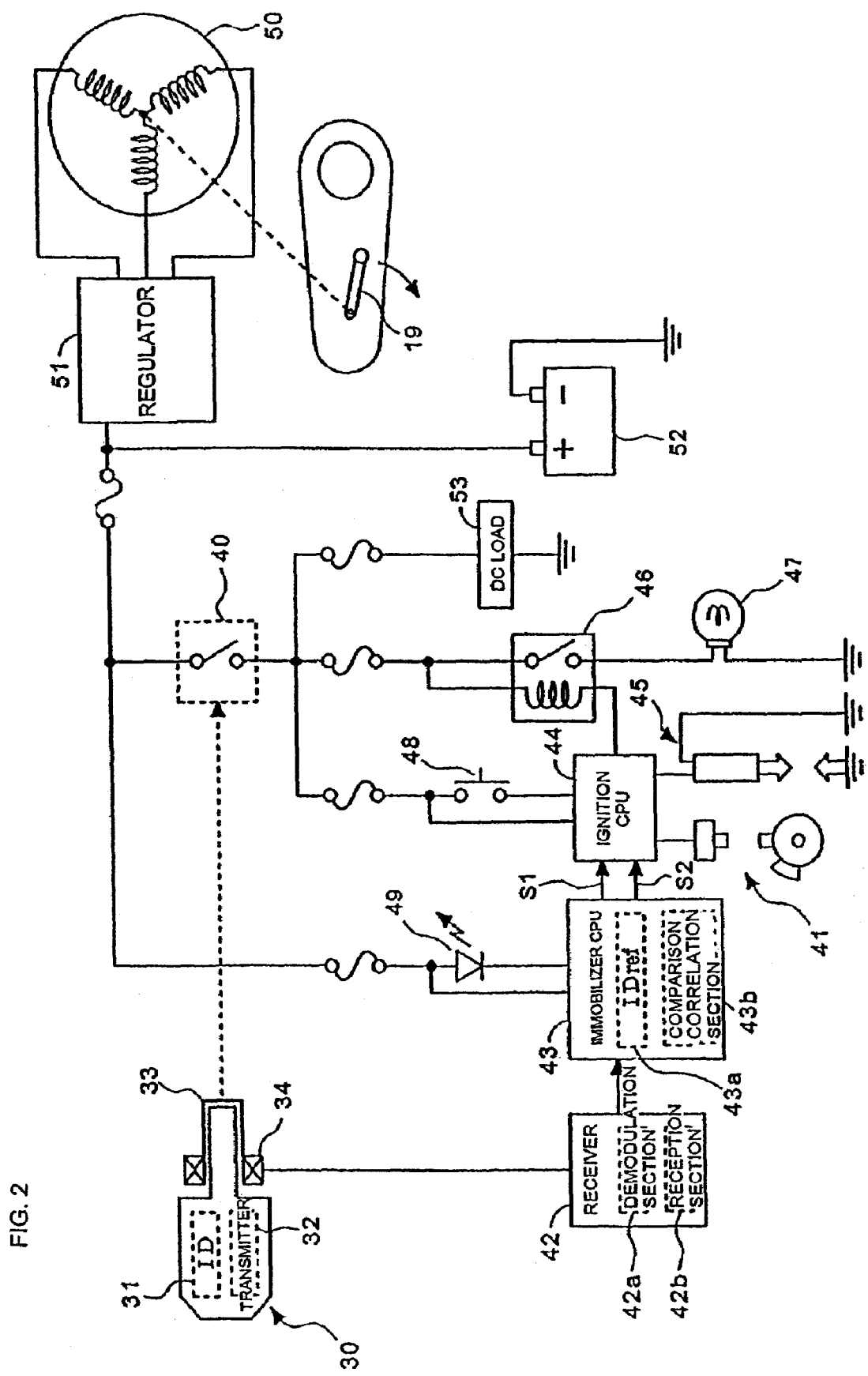
FIG. 2 is a block diagram showing a configuration of a major portion of the engine starting apparatus with an antitheft function according to the present invention.

FIG. 2 is a simplified schematic block diagram showing major portions of the engine starting apparatus with an antitheft function according to the selected embodiment of the present invention. Like reference characters to those described above denote like or equivalent elements.

An ignition key 30 has a memory 31 built therein, in which an identification code [ID] is stored in advance, along with a transmitter 32 for transmitting the identification code. The transmitter 32 of the ignition key 30 and a key cylinder 33 are coupled to each other, for example, by an induction coil (antenna) 34.

When the ignition key 30 is inserted in the key cylinder 33, power is supplied to the transmitter 32 from a receiver 42 through the induction coil 34. In response to this, the transmitter 32 reads the authentication code from the memory 31, and transmits it to the key cylinder 33 side. The authentication code is received by a reception section 42a of the receiver 42, and is then demodulated into a digital code by a demodulation section 42*b*, and conveyed to an immobilizer CPU 43.

The immobilizer CPU 43 includes a storage section 43*a* for storing a reference code $[ID_{ref}]$ unique to each vehicle and a correlation comparison section 43*b* for comparing the identification code [ID] conveyed thereto and the reference code $[ID_{ref}]$ to each other.

An indicator lamp 49 is connected in series to a power supply line to the immobilizer CPU 43. The correlation comparison section 43*b* outputs a permission signal when it is determined that the identification code [ID] and the reference code $[ID_{ref}]$ coincide with each other, or have a relationship determined in advance. However, the correlation comparison section 43*b* outputs an inhibition signal when they do not coincide with each other or do not have the relationship determined in advance as an authentication result signal (S1, S2) to an ignition CPU 44.

When driving power is supplied from an ignition switch 40, the ignition CPU 44 begins supplying power to enable starting of the engine. Then, the ignition CPU 44 detects an ignition timing based on a pulser signal detected by a pulser unit 41, and energizes an ignition unit 45 every time an ignition timing occurs. After the engine is started, the ignition CPU 44 energizes a headlamp relay 46 to cause the headlamp 47 to emit light. An engine stopping switch 48 is connected in series to a power supply line to the ignition CPU 44.

An ACG (alternating current generator-motor) starter 50 is connected to the crankshaft of the engine, and also to the kick pedal 19. A regulator 51 limits an output voltage of the ACG starter 50 to a predetermined voltage, and outputs the predetermined voltage to be supplied to the control units 43, 44 mentioned hereinabove, and also to a battery 52 and a further DC load 53.

Figure 3:
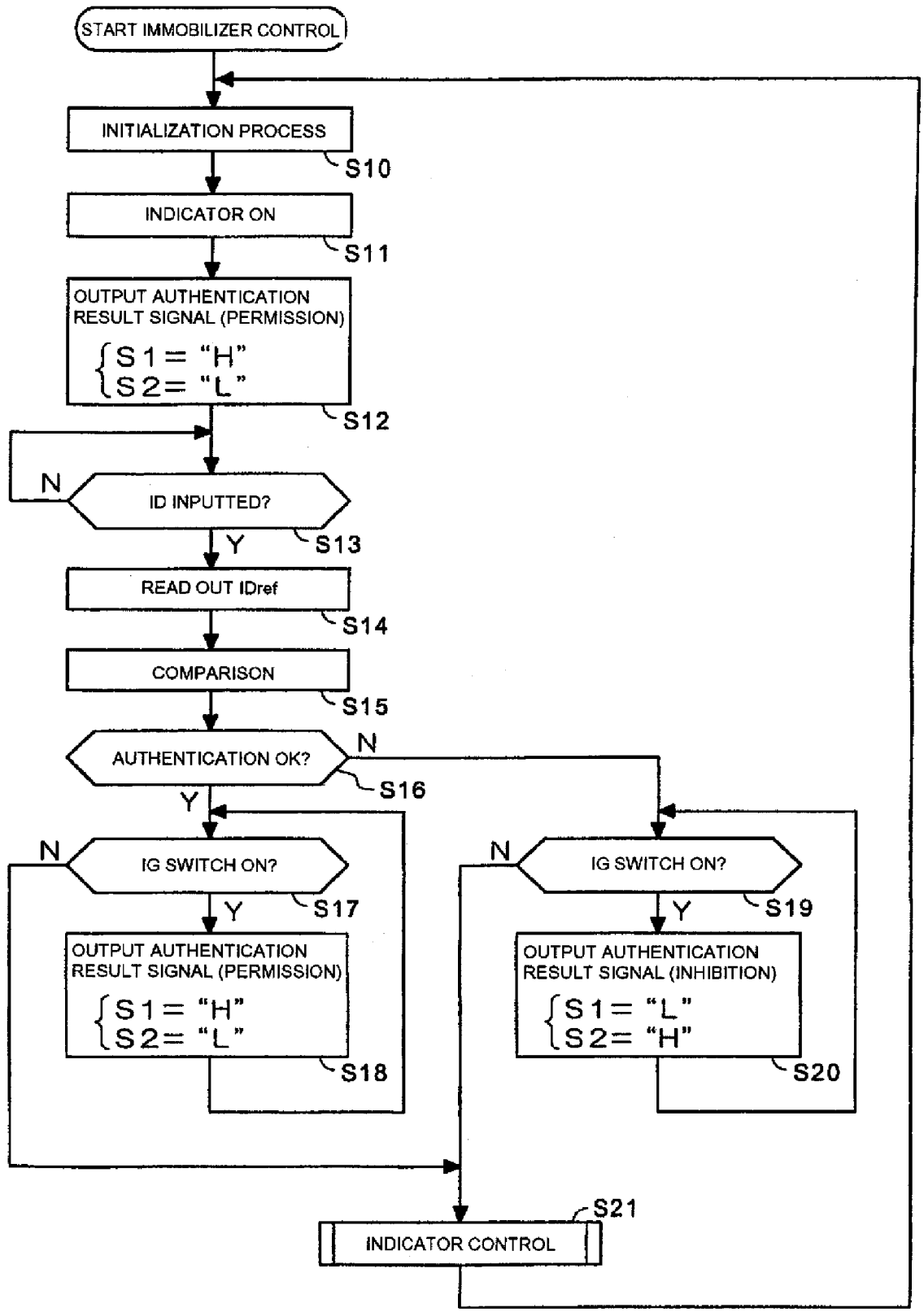
FIG. 3 is a flow chart illustrating a procedure of "immobilizer control" executed by an immobilizer CPU.

Now, operation of the depicted embodiment is described in detail with reference to flow charts. FIG. 3 is a flow chart illustrating a procedure of immobilizer control executed by the immobilizer CPU 43.

At step S10, an initialization process is executed, which is unique to the immobilizer CPU 43. At step S11, flickering of the indicator lamp 49 is started.

At step S12, an authentication result signal is sent out to the ignition CPU 44. In the present embodiment, the authentication result signal is formed from a pair of authentication result signals S1 and S2, that is, 2 bits. It is defined that a combination (H, L) of the "H" level of the signal S1 and the "L" level of the signal S2 represents "permission". Another combination (L, H) of the "L" level of the signal S1 and the "H" level of the signal S2 represents "inhibition". In the example shown at step S12 in FIG. 3, the combination of (S1=H, S2=L) corresponding to the "permission" is sent out.

Information communication between the immobilizer CPU 43 and the ignition CPU 44 is performed using multi bits in this manner. Thereby, information communication between the ignition CPU 44 and the immobilizer CPU 43 can be performed with a higher degree of accuracy.

At step S13, an identification code [ID] received from the ignition key 30 and demodulated by the receiver 42 is fed in. At step S14, the reference code $[ID_{ref}]$ stored in the storage section 43*a* is read out. At step S15, the identification code [ID] fed in and the reference code $[ID_{ref}]$ are compared and correlated with each other by the correlation comparison section 43*b*.

At step S16, a result of the comparison is evaluated. If the identification code [ID] and the reference code $[ID_{ref}]$ coincide with each other, or have the relationship determined in advance, then the processing advances to step S17. At step S17, it is determined whether or not the ignition switch 40 is on. If the ignition switch 40 is on, then the processing advances to step S18. At step S18, an authentication result signal (permission) wherein the signal S1 has the "H" level and the signal S2 has the "L" level is sent out.

On the other hand, if, at step S16 described above, the identification code [ID] and the reference code $[ID_{ref}]$ do not coincide with each other or do not have the relationship determined in advance, then the processing advances to step S19. At step S19, it is determined whether or not the ignition switch 40 is on. If the ignition switch 40 is on, then the processing advances to step S20. At step S20, which an authentication result signal (inhibition) wherein the signal S1 has the "L" level and the signal S2 has the "H" level is sent out. It is to be noted that, if it is determined at one of steps S17 and S19 that the ignition switch 40 is off, then the processing advances to step S21. At step S21, indicator control for controlling the indicator lamp 49 is executed.

Figure 4:
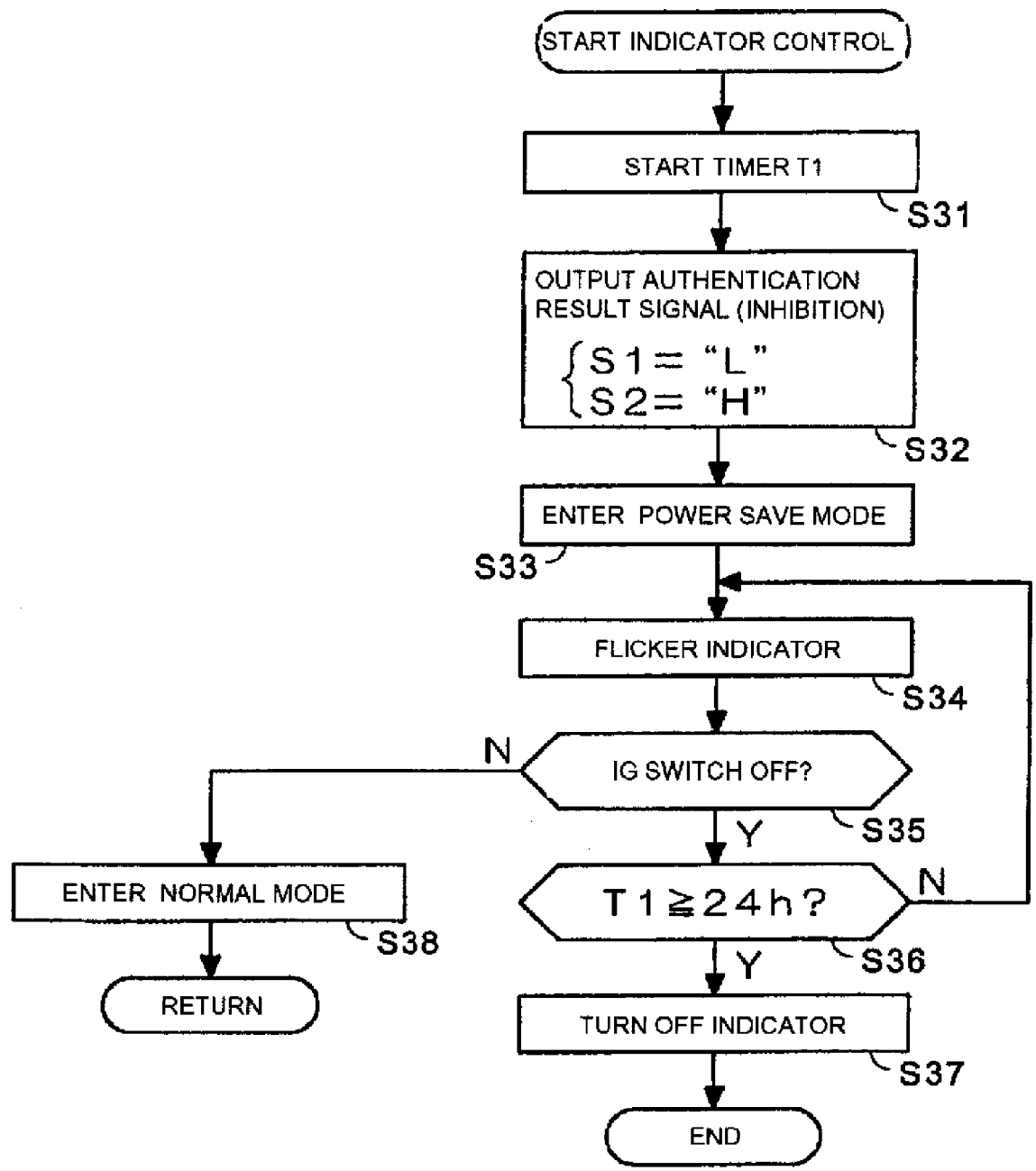
FIG. 4 is a flow chart illustrating a procedure of indicator control.

FIG. 4 is a flow chart illustrating a procedure for the indicator control. At step S31, a 24-hour timer T1 is started. At step S32, an authentication result signal (inhibition) wherein the signal S1 has the "L" level and the signal S2 has the "H" level is sent out. At step S33, the procedure enters a power save mode. At step S34, the indicator lamp 49 starts flickering. At step S35, it is determined whether or not the ignition switch 40 remains off.

If the ignition switch 40 remains off, then the processing advances to step S36. At step S36, it is determined whether or not the timer T1 exhibits a time-out state. If the timer T1 exhibits a time-out state, that is, if 24 hours elapse after the ignition switch 40 is switched off, then the indicator lamp 49 is turned off at step S37 to suppress the power consumption of the battery 52. On the other hand, if it is detected at step S35 that the ignition switch 40 is turned on, then the processing advances to step S38. At step S38, the mode changes from the power save mode back to a normal mode.

Figure 5:
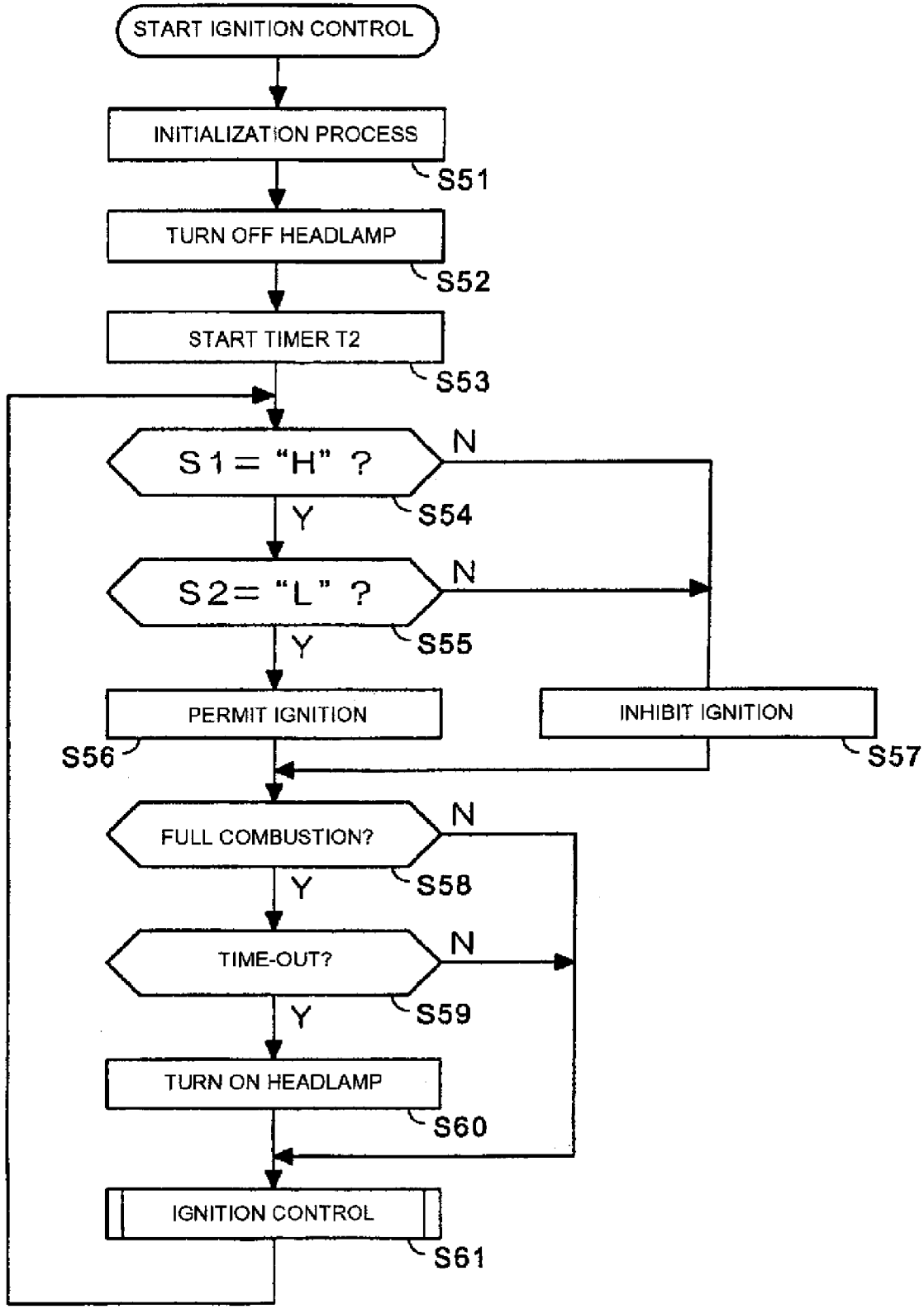
FIG. 5 is a flow chart illustrating a procedure of "starting control" executed by an ignition CPU.

FIG. 5 is a flow chart illustrating a procedure of the "starting control" executed by the ignition CPU 44. At step S51, an initialization process is executed, which is unique to the ignition CPU 44. At step S52, energization of the headlamp relay 46 is inhibited to turn off the headlamp 47. At step S53, a timer T2 starts. At steps S54 and S55, the authentication result signals S1 and S2 are referred to. If the authentication result signals S1 and S2 exhibit the "permission" condition wherein the signal S1 has the "H" level and the signal S2 has the "L" level, then the processing advances to step S56. At step S56, an ignition permission flag is set. On the other hand, if the authentication result signals S1 and S2 exhibit the "inhibition" condition, then the processing advances to step S57. At step S57, an ignition inhibition flag is set.

At step S58, it is determined based on an engine speed and so forth whether or not the engine is in a full combustion condition. If the engine is in a full combustion condition, then the processing advances to step S59. At step S59, it is determined whether or not the timer T2 is in a time-out condition. In the present embodiment, the timer T2 is set in advance such that it exhibits a time-out state at 200 ms. If the timer T2 is in a time-out condition, then the processing advances to step S60. At step S60, energization of the headlamp relay 46 is started to turn on the headlamp.

At step S61, ignition control is executed. If the ignition permission flag is in a set state, then the ignition unit 45 is energized at every ignition timing determined based on the pulser signal. If the ignition inhibition flag is in a set state, then the ignition is inhibited irrespective of any ignition timing.

Figure 6:
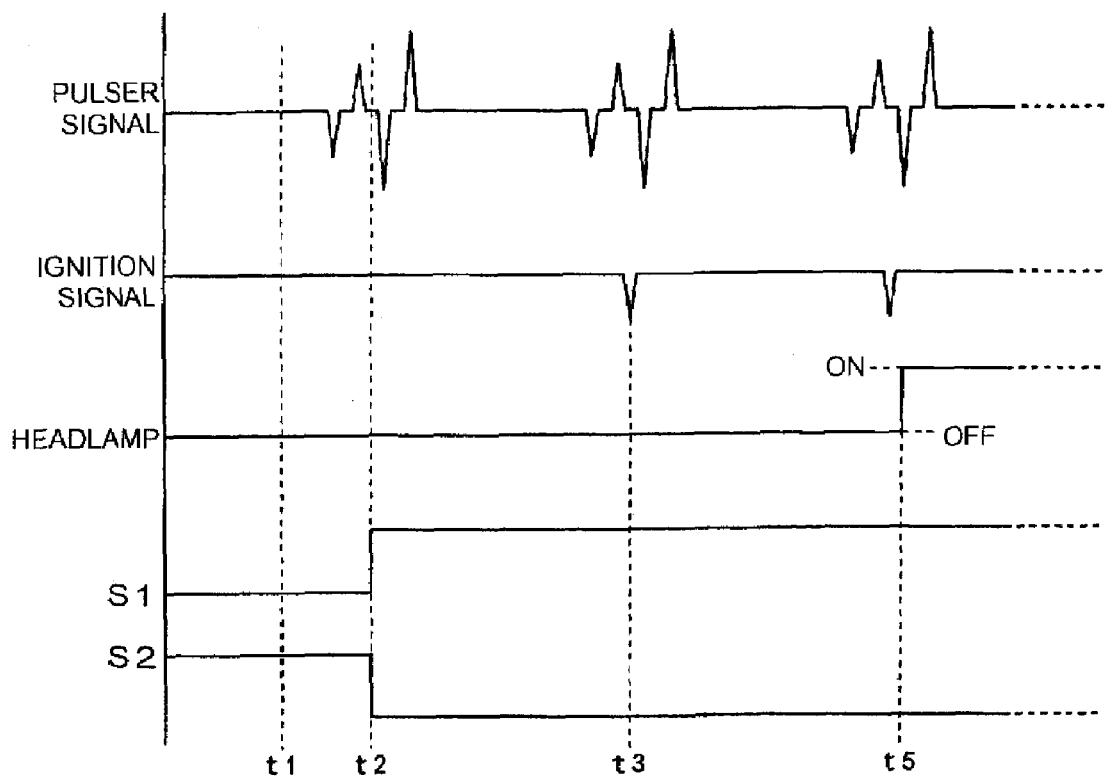
FIG. 6 is a timing chart (ignition permission) illustrating operation of the present embodiment.
Figure 7:
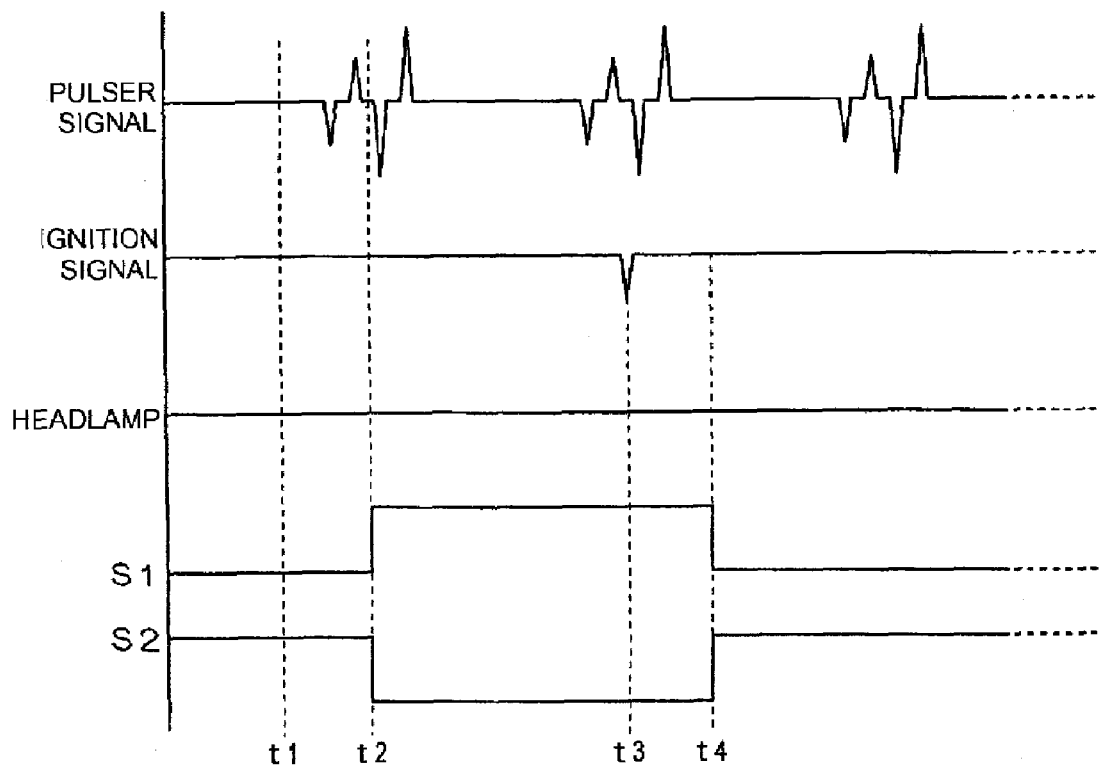
FIG. 7 is a timing charge (ignition inhibition) illustrating operation of the present embodiment.

FIGS. 6 and 7 are timing charts illustrating the operation of the present embodiment described above. In particular, FIG. 6 illustrates the operation when the identification code [ID] and the reference code [$ID_{ref}$] coincide with each other. FIG. 7 illustrates the operation when the identification code [ID] and the reference code [$ID_{ref}$] do not coincide with each other.

Referring to FIG. 6, the ignition key 30 is inserted into the key cylinder 33 and turned to switch on the ignition switch 40 at time t1. Thereafter, the kick pedal 19 is kicked. The output voltage of the regulator 51 reaches a driving voltage for the CPUs 43 and 44 at time t2. Then, the immobilizer CPU 43 starts the "immobilizer control" (FIG. 3) and the ignition CPU 44 starts the "starting control" (FIG. 5).

After the "immobilizer control" (FIG. 3) is started, an authentication result signal (permission) is sent out at step S12. Thus, the level of the signal S1 changes to the "H" level and the level of the signal S2 changes to the "L" level. In the "starting control" (FIG. 5), the authentication result signal (permission) is detected at steps S54 and S55, and the processing advances to step S56. At step S56, the ignition permission flag is set. Since it is determined at step S58 that the engine is not in a full combustion condition as yet, the processing advances to step S61. At step S61, the ignition control is started. When an ignition timing comes at time t3, the ignition unit 45 is energized because the ignition permission flag is in a set state.

Returning to the "immobilizer control" (FIG. 3), at step S15, an identification code [ID] received from the ignition key 30 and the reference code [$ID_{ref}$] are compared with each other. If it is confirmed at step S16 that they coincide with each other or have the relationship determined in advance, then the processing advances to step S18, at which an authentication result signal (permission) is sent out. Accordingly, the ignition CPU 44 can continue to cause the ignition unit 45 to be energized every time an ignition timing comes at step S61 of the "starting control" (FIG. 5).

Thereafter, the engine exhibits a full combustion condition at time t5, and this is detected at step S58. Then, if it is detected at step S59 that the timer T2 exhibits a time-out condition, then the headlamp 47 is turned on at step S60.

On the other hand, suppose that it is determined at step S16 in the "immobilizer control" of FIG. 3 that the identification code [ID] and the reference code [$ID_{ref}$] do not coincide with each other and an authentication result signal (inhibition) is sent out at step S20. Then, the processing of the ignition CPU 44 advances from step S54 or S55 to step S57. At step S57, the ignition inhibition flag is set at time t4. Accordingly, since the ignition unit 45 is not energized thereafter by the ignition control at step S61 even if an ignition timing comes, starting of the engine is blocked.

It is to be noted that, it is described in the description of the embodiment above that starting of the engine is controlled by permitting or inhibiting operation of the ignition unit 45 in response to the authentication result signals S1 and S2. However, the present invention is not limited to this. In particular, starting of the engine may be controlled otherwise by permitting or inhibiting operation of an injector or a fuel pump.

Further, in the present embodiment, the ID authentication by the immobilizer CPU 43 and the engine starting determination are performed before the crankshaft of the engine 13 is rotated twice after a point of time of generation by the kick pedal 19. The ID authentication and the engine starting permission determination are performed in a short period of time while the crankshaft makes two rotations in this manner. Therefore, even if the ID authentication results in failure, the driver can be prevented from realizing starting of the engine before the ID authentication.

Although the present invention has been described herein with respect to a number of specific illustrative embodiments, the foregoing description is intended to illustrate, rather than to limit the invention. Those skilled in the art will realize that many modifications of the preferred embodiment could be made which would be operable. All such modifications, which are within the scope of the claims, are intended to be within the scope and spirit of the present invention.

What is claimed is:

1. An engine starting apparatus with an antitheft function for permitting or inhibiting starting of an engine depending upon whether or not two codes have a relationship set in advance, said engine starting apparatus with an antitheft function comprising:
   an authentication mechanism for comparing an authentication code, fed in from outside of a vehicle, and a reference code registered in advance in the vehicle, wherein the authentication mechanism is operable to generate a permission signal if the authentication code correlates with the reference code, and is further operable to generate an inhibition signal if the authentication code and the reference code fail to correlate, as an authentication result; and
   a starting control mechanism for beginning starting control before the authentication result is sent out in response to actuation of a kick starting mechanism, said starting control involving steps of executing an initialization process, inhibiting energization of the headlamp, and starting a timer;
   wherein said starting control mechanism is operable to continue the starting control in response to the permission signal, and is further operable to disable engine operation in response to the inhibition signal.

2. The engine starting apparatus with an antitheft function according to claim 1, wherein said engine starting apparatus further comprises:
   a regulator for regulating a driving voltage obtained by kick starting and outputting the regulated driving voltage to a power supply line;
   a first feed line for supplying the driving voltage from said power supply line to said authentication mechanism; and
   a second feed line for supplying the driving voltage from said power supply line to said staffing control mechanism through a first switch;
   wherein said authentication mechanism is operable to start the authentication when the driving voltage exceeds a predetermined value;
   and wherein said starting control mechanism begins the starting control when said first switch is on and the driving voltage exceeds the predetermined value.

3. The engine staffing apparatus with an antitheft function according to claim 2, wherein said engine starting apparatus further comprises:
   an electric load to which the driving voltage is supplied from said power supply line through a second switch;
   and wherein said second switch is controlled to an off state for a period of time before said engine exhibits full combustion after the staffing control is begun.

4. The engine staffing apparatus with an antitheft function according to claim 1, wherein said starting control mechanism is operable to permit or inhibit operation of an ignition system in response to the authentication result.

5. The engine staffing apparatus of claim 1, wherein said authentication mechanism comprises an immobilizer central processing unit (CPU), and wherein said staffing control mechanism comprises an ignition CPU.

6. The engine starting apparatus of claim 5, wherein the immobilizer CPU is separate from the ignition CPU.

7. A motorcycle, comprising:
   an engine having a crankshaft; and
   the engine starting apparatus of claim 1, further comprising an ignition key having said authentication code stored therein;
   wherein said authentication mechanism comprises an immobilizer central processing unit (CPU) having said reference code stored therein.

8. The motorcycle of claim 7, wherein said motorcycle comprises:
   a receiver in electronic communication with said immobilizer CPU; and
   a key cylinder comprising an induction coil;
      wherein said key comprises a transmitter for transmitting said authentication code to said receiver;
      and wherein said induction coil in said key cylinder is operable to provide power to said transmitter in said key when said key is inserted into said key cylinder.

9. The motorcycle of claim 7, wherein said engine starting apparatus is operable to enable staffing of said engine within two revolutions of said crankshaft.

10. The motorcycle of claim 8, wherein said engine staffing apparatus is operable to enable staffing of said engine within two revolutions of said crankshaft.

11. A method of controlling engine starting in a vehicle, comprising the steps of:
    a) beginning to energize an engine ignition system of the vehicle via a starting control mechanism in response to actuation of a kick switch using a starting control sequence which comprises steps of executing an initialization process, inhibiting energization of the headlamp, and starting a timer;
    b) comparing an authentication code, fed in from outside of the vehicle, with a reference code stored in the vehicle,
    c) generating a signal as an authentication result in response to the result of the comparing step using an authentication mechanism, wherein the authentication result is a permission signal if the authentication code correlates with the reference code, and the authentication result is an inhibition signal if the authentication code and the reference code fail to correlate, as an authentication result;
    wherein the beginning to energize step takes place before the authentication result is sent out in response to a predetermined engine starting instruction; and
    d) continuing to energize the starting control if the authentication result is a permission signal, or disabling engine operation if the authentication result is an inhibition signal.

12. The method of claim 11, further comprising the steps of:
    e) regulating a driving voltage obtained as a result of said actuating step, and outputting the regulated driving voltage to a power supply line;
    f) supplying the driving voltage from said power supply line through a first feed line to said authentication mechanism; and
    g) supplying the driving voltage from said power supply line to said starting control mechanism through a first switch via a second feed line;
    wherein said authentication mechanism is operable to start the authentication when the driving voltage exceeds a predetermined value;
    and wherein said starting control mechanism begins the starting control when said first switch is on and the driving voltage exceeds the predetermined value.

13. The method of claim 12, further comprising the step of:
    h) supplying the driving voltage from said power supply line to an electric load through a second switch;
    wherein said second switch is controlled to an off state for a period of time before said engine exhibits full combustion after the staffing control is begun.

14. The method of claim 11, wherein said authentication mechanism comprises an immobilizer central processing unit (CPU), and wherein said staffing control mechanism comprises an ignition CPU.

15. The method of claim 14, wherein the immobilizer CPU is separate from the ignition CPU.

* * * * *